(12) United States Patent
Sahita et al.

(10) Patent No.: US 8,464,251 B2
(45) Date of Patent: Jun. 11, 2013

(54) METHOD AND APPARATUS FOR MANAGING PAGE TABLES FROM A NON-PRIVILEGED SOFTWARE DOMAIN

(75) Inventors: Ravi Sahita, Beaverton, OR (US); Uday Savagaonkar, Hillsboro, OR (US); Paul Schmitz, North Plains, OR (US)

(73) Assignee: Intel Corporation, Santa Clara, CA (US)

( * ) Notice: Subject to any disclaimer, the term of this patent is extended or adjusted under 35 U.S.C. 154(b) by 1610 days.

(21) Appl. No.: 11/695,021

(22) Filed: Mar. 31, 2007

(65) Prior Publication Data

US 2008/0244573 A1    Oct. 2, 2008

(51) Int. Cl.
G06F 9/455 (2006.01)
G06F 12/14 (2006.01)
G06F 12/16 (2006.01)

(52) U.S. Cl.
USPC .............................................. 718/1; 726/22

(58) Field of Classification Search
USPC ...... 718/1, 100, 101; 711/6, 100, 163; 726/22
See application file for complete search history.

(56) References Cited

U.S. PATENT DOCUMENTS

| | | | |
|---|---|---|---|
| 5,983,350 A | 11/1999 | Minear et al. | |
| 6,631,417 B1 | 10/2003 | Balabine | |
| 6,725,371 B1 | 4/2004 | Verhoorn, III et al. | |
| 6,732,220 B2 | 5/2004 | Babaian et al. | |
| 7,111,146 B1 | 9/2006 | Anvin | |
| 7,370,233 B1 | 5/2008 | Sobel et al. | |
| 7,953,980 B2 * | 5/2011 | Schluessler et al. | 713/176 |
| 8,266,676 B2 * | 9/2012 | Hardjono et al. | 726/3 |
| 2002/0046305 A1 | 4/2002 | Babaian et al. | |
| 2002/0082824 A1 | 6/2002 | Neiger et al. | |
| 2003/0065676 A1 | 4/2003 | Gbadegesin et al. | |
| 2005/0132122 A1 * | 6/2005 | Rozas | 711/100 |
| 2005/0220143 A1 | 10/2005 | DelRegno et al. | |
| 2005/0235123 A1 | 10/2005 | Zimmer et al. | |
| 2006/0004944 A1 * | 1/2006 | Vij et al. | 711/6 |
| 2006/0225073 A1 | 10/2006 | Akagawa et al. | |
| 2007/0006175 A1 | 1/2007 | Durham et al. | |
| 2007/0043896 A1 * | 2/2007 | Daruwala et al. | 711/6 |
| 2007/0143629 A1 * | 6/2007 | Hardjono et al. | 713/189 |
| 2007/0300219 A1 * | 12/2007 | Devaux | 718/1 |
| 2008/0022129 A1 * | 1/2008 | Durham et al. | 713/189 |
| 2008/0244572 A1 | 10/2008 | Sahita et al. | |
| 2008/0244725 A1 * | 10/2008 | Dewan et al. | 726/13 |
| 2008/0244758 A1 | 10/2008 | Sahita et al. | |
| 2009/0089860 A1 * | 4/2009 | Forrester et al. | 726/3 |

OTHER PUBLICATIONS

Dewan, P., et al., "Method and Apparatus for Managing Packet Buffers", U.S. Appl. No. 11/695,016, filed Mar. 31, 2007, 17 pgs.
Grevstad, E., "CPU-Based Security: The NX Bit", [online]. © 2004 Jupitermedia Corporation [retrieved on Jul. 10, 2004]. Retrieved from the Internet: <URL: http://web.archive.org/web/20040710104953/ http://hardware.earthweb.com/chips/article.php/3358421>, (2004), 3 pgs.
Sahita, R., et al., "Method and Apparatus for Adaptive Integrity Measurement of Computer Software", U.S. Appl. No. 11/694,478, filed Mar. 30, 2007, 18 pgs.
Sahita, R., et al., "Systems and Methods for Secure Association of Hardware Devices", U.S. Appl. No. 11/694,548, filed Mar. 30, 2007, 17 pgs.
Uhlig, R., et al., "Intel Virtualization Technology", *IEEE Computer Society*, 38(1), (2005), 48-56.

* cited by examiner

*Primary Examiner* — Emerson Puente
*Assistant Examiner* — Willy W Huaracha
(74) *Attorney, Agent, or Firm* — Barre Law Firm, PLLC

(57) ABSTRACT

A virtual machine monitor; and an executive virtual machine to manage page tables in place of the virtual machine monitor are described. Other embodiments may be described and claimed.

16 Claims, 4 Drawing Sheets

METHOD AND APPARATUS FOR MANAGING PAGE TABLES FROM A NON-PRIVILEGED SOFTWARE DOMAIN

TECHNICAL FIELD

Various embodiments described herein relate to computer systems generally, including managing page tables from a non-privileged software domain.

BACKGROUND

Virtualization technology integrity services ensure that software (including code and data) is protected from tamper. Virtualization technology integrity services may use a Virtual Machine Monitor (VMM). A VMM allows multiple operating systems to run concurrently under virtual machines.

DETAILED DESCRIPTION

The following detailed description is divided into four sections. The first section presents a system overview of the inventive subject matter. The second section provides methods of using example embodiments of the inventive subject matter. The third section describes example implementations.

System Level Overview

Embodiments of the inventive subject matter describe systems and methods to allow software at a lower privilege level to be able to manage page tables that manage access to the physical memory on the platform.

In one embodiment the software at a lower privilege level is a virtual machine. The virtual machine may be, but is not limited to Ring 0/3D in an Intel VT processor. The virtual machine is referred to herein as an Executive Virtual Machine (EVM) because the VMM offloads one of its executive or critical operations to this Virtual Machine. This approach allows the EVM to a) setup protected page tables for OS agent software that provides an Integrity Manifest which is used to verify OS agent memory; b) interpret policies specified in the agent Integrity Manifest to share/hide code or data for the agent; c) reduce the performance impact by reducing time spent in VMX root mode of operation; d) sync paging events and Source access control actions as setup by the platform owner; and e) reduce attack surface into the VMM.

Figure 1:
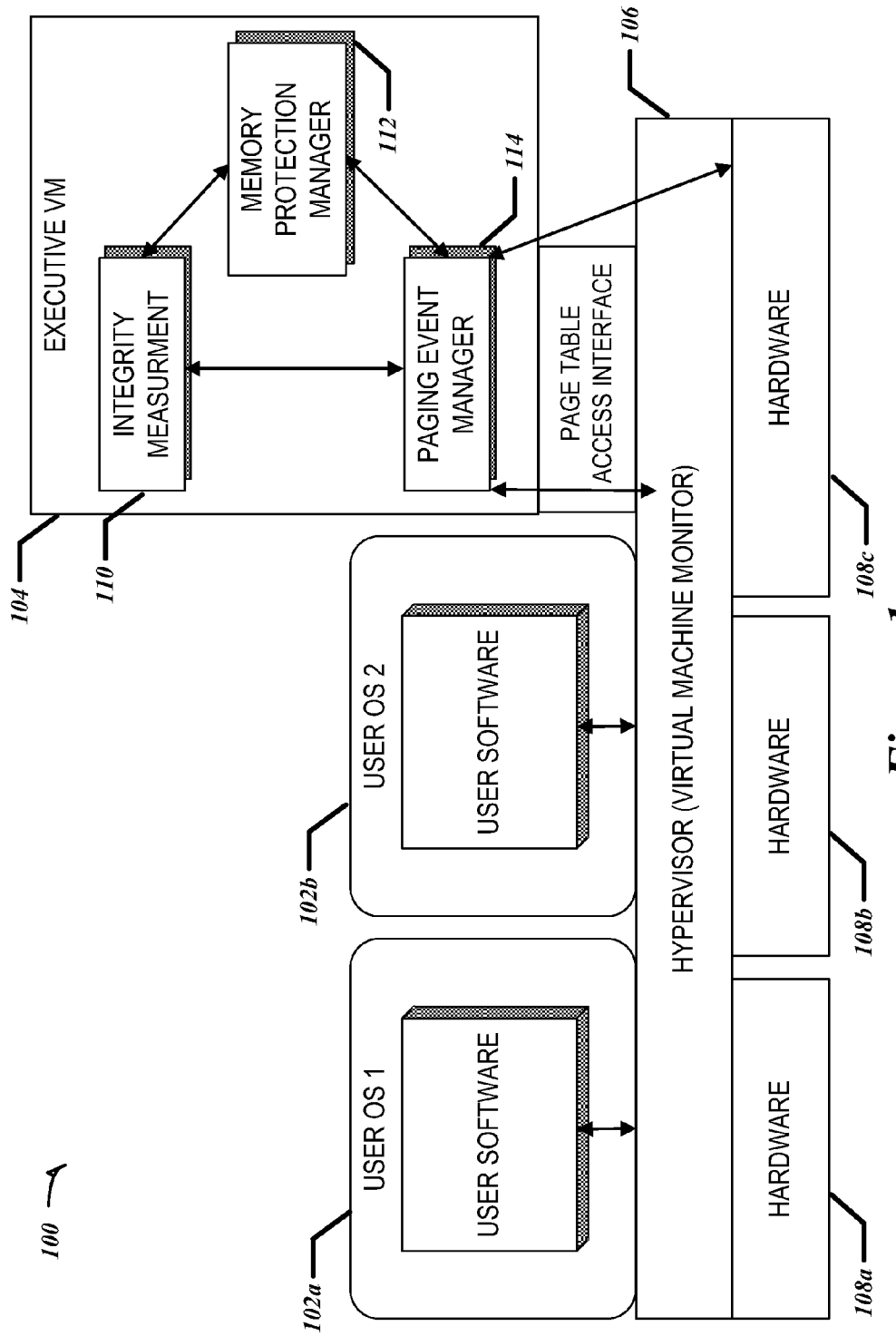
FIG. 1 is a block diagram of a system according to various embodiments of the invention.

FIG. 1 is a block diagram of a system according to various embodiments of the invention. As shown in FIG. 1, system 100 comprises one or more user operating systems 102a, 102b, an executive virtual machine 104, a virtual machine monitor (VMM) 106, and one or more hardware components 108a, 108b, 108c. The executive virtual machine 104 further comprises an Integrity Measurement module 110, a Memory Protection module 112, and a Paging Event Manager 114.

The Integrity Measurement module 110 measures the integrity of a software component (e.g., device driver) at runtime by inspecting its code/data image in memory and comparing it against a pre-defined Integrity Manifest specific to that software agent.

The Memory Protection module 112 sets up the memory protections to the software component (e.g., device driver) that is loaded in the context of the operating system, and whose integrity has been verified by the Integrity Measurement module 110 described above. In one embodiment, there may be three types of memory protection that can be setup. A first type of memory protection is protection from modification. Protection from modification means that code/data belonging to a protected software component cannot be modified (i.e. written to) by other software components. A second type of memory protection modification is protection from eavesdropping. Protection from eavesdropping means that code/data that the protected software component intends to keep private cannot be observed (i.e. read) by other software components. A third type of memory protection is protection from control-flow attacks. Protection from control-flow attacks means that a protected component can be invoked (jumped or called into) by other software components only at intended entry points.

As described below, the Integrity Measurement Module 110, and the Memory Protection Module 112 may operate on top of a hypervisor (VMM 106) exposing an API to setup page level protections for the platform software. The Integrity Measurement module 110 and the Memory Protection module 112 may be incorporated in a virtual machine.

In one embodiment, the virtual machine is referred to as an Executive Virtual Machine (EVM) 104. The EVM 104 is a software module that runs in de-privileged (non-VMX-root) mode on a processor, including but not limited to, an Intel Virtualization Technology processor. This software may be optimized to run efficiently on hardware virtualization, for example, only few contexts are created in this guest, such that this code itself does not cause additional VM-exits. This software module incorporates the Integrity Measurement module 110 and the Memory Protection Module 112 described above.

The Executive Virtual Machine 104 also includes an Paging Event Manager module 114. The Paging event manager module 114 is responsible to register with the VMM 106 to receive all events from the VMM 106 for integrity services. This includes paging events that are of critical importance to physical memory access control. In one embodiment, specific paging events that this module receives are page fault events; attempts to move a new value into the Page Table Base register (EPTP or CR3); as well as attempts to invalidate previous guest linear to guest physical mappings i.e. execution of the INVLPG (invalidate page) by a guest OS. In an example embodiment, the Paging Event Manager Module 114 interacts with the Memory Protection Module 112, and the Integrity Measurement Module 110 as described below.

Based on paging events, the Paging Event Manager module 114 may pass information to the Integrity Measurement module 110 to initiate new or incremental integrity measurements for code/data belonging to a registered agent, or a new agent. Other examples of dynamic content that may be measured due to an event received by the Paging event manager module 114 is dynamic data created by the agent that is to be check-pointed.

Based on paging events, the Paging Event Manager module 114 may call the Memory Manager module 112 to change the settings on an existing page in the protected page table, or in the active page table for a guest OS or guest OS agent.

Based on paging events, the Paging Event Manager module 114, may initiate a set of measurements which may trigger updates to multiple memory protection changes.

The paging events received by the Paging Event Manager module 114 may cause interaction of the EVM 104 with other virtual machines, VMM 106 capabilities or hardware device capabilities such as hardware circuit breaker (aka system defense) to disconnect the platform for the network.

Other events such as registration/deregistration of guest OS agents cause changes to be made by the Memory Protection Manager module 112.

Embodiments of system 100 may comprise a computer, a memory system, a magnetic or optical disk, some other storage device, or any type of electronic device or system. The system 100 may include one or more processor(s) coupled to a machine-accessible medium such as a memory (e.g., a memory including electrical, optical, or electromagnetic elements). The medium may contain associated information (e.g., computer program instructions, data, or both) which, when accessed, results in a machine (e.g., the processor(s)) performing the activities previously described herein.

Figure 2:
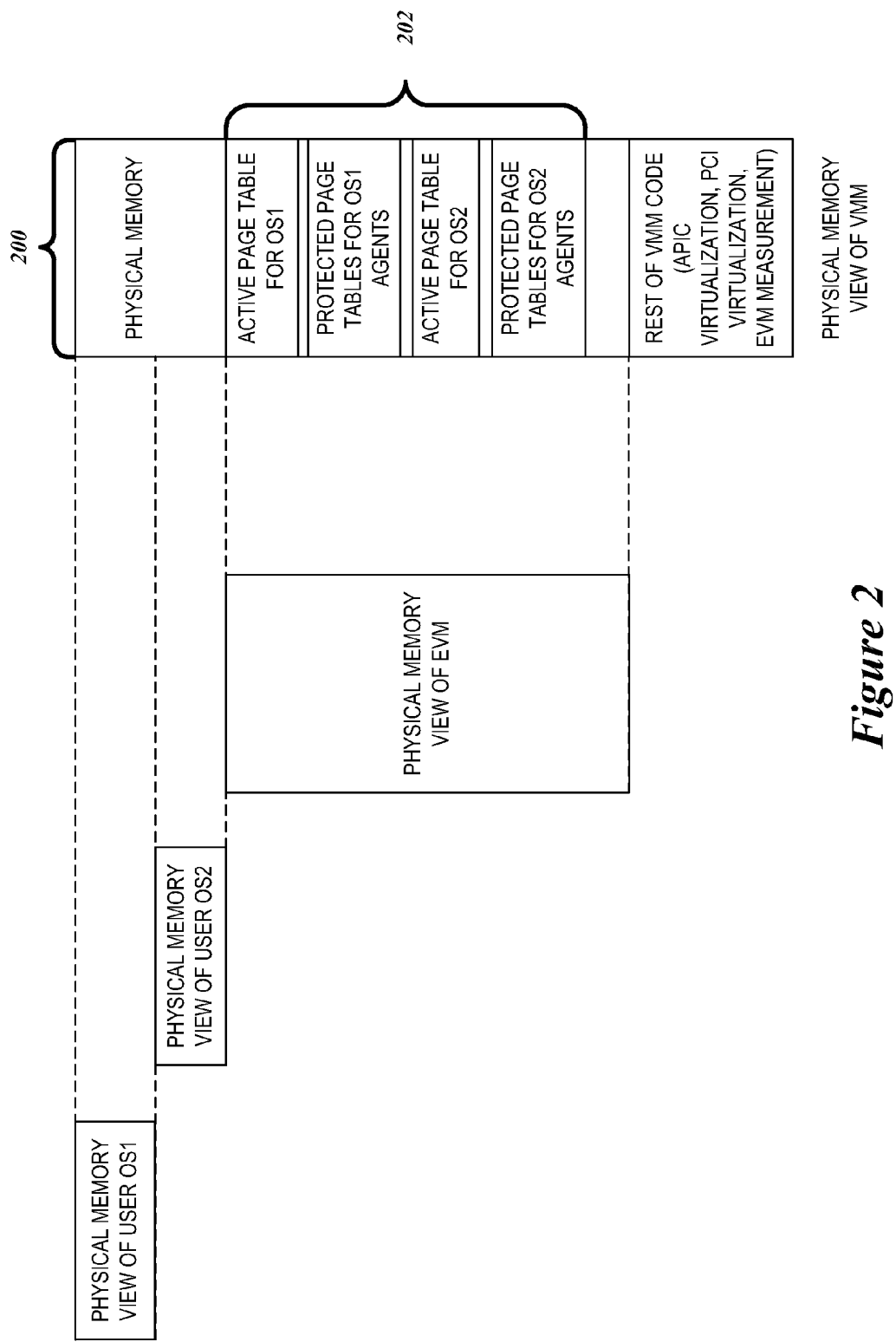
FIG. 2 is a block diagram of physical memory for a system such as the system of FIG. 1 according to various embodiments of the invention.

FIG. 2 is a block diagram of physical memory for a system such as the system of FIG. 1 according to various embodiments of the invention. As shown in FIG. 2, a physical memory 200 comprises page tables 202 for the one or more user operating systems 102a, 102b shown in FIG. 1. User OS1 102a does not have access to the page tables 202 in its view of the physical memory 200. Likewise, User OS2 102b does not have access to the page tables 202 in its view of the physical memory 200. However, the EVM 104 does have access to the page tables 202 in physical memory 200 for both User OS1 102a and User OS2 102b according to various embodiments of the invention. As shown in FIG. 2, the VMM 106 has access to the entire view of physical memory 200. Thus, the physical memory management function is offloaded from the VMM 106 to the EVM for integrity services such as managing page tables according to various embodiments described above.

Various embodiments of the system described herein use platform features such as virtualization technology to verify the integrity of software without major changes to the Virtual Machine Monitor while at the same time allowing all possible types of policies to be applied on memory used by software agents. This architecture allows a platform to handle various combinations of policies described in an agent Manifest and also allows Integrity Services software to be securely replaced/extended or updated on the platform by partner ISVs/OSVs without requiring changes to the VMM which may be hosted in platform firmware (or ROM).

Methods

Figure 3:
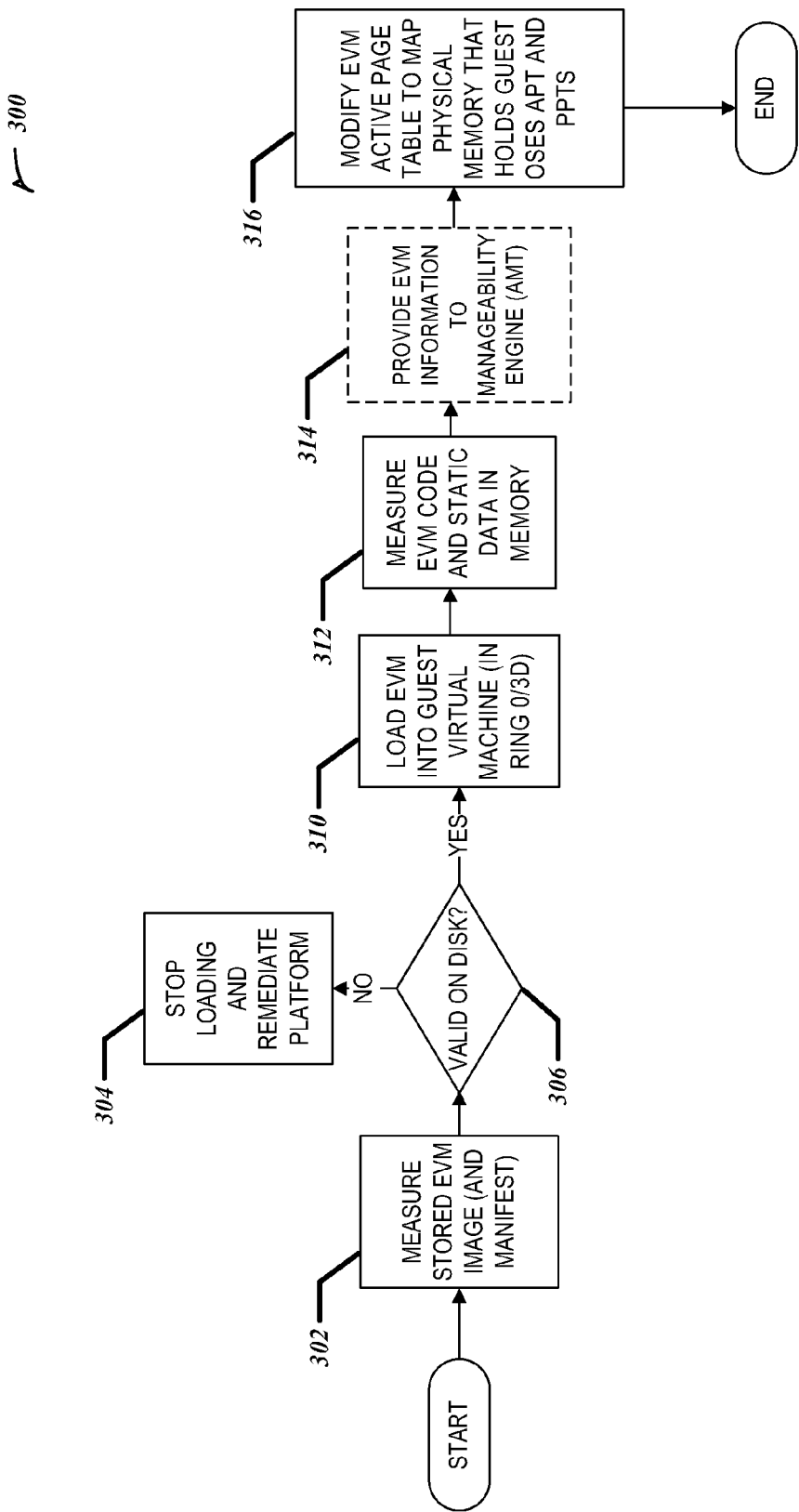
FIG. 3 is a flow diagram illustrating several setup methods according to various embodiments of the invention.
Figure 4:
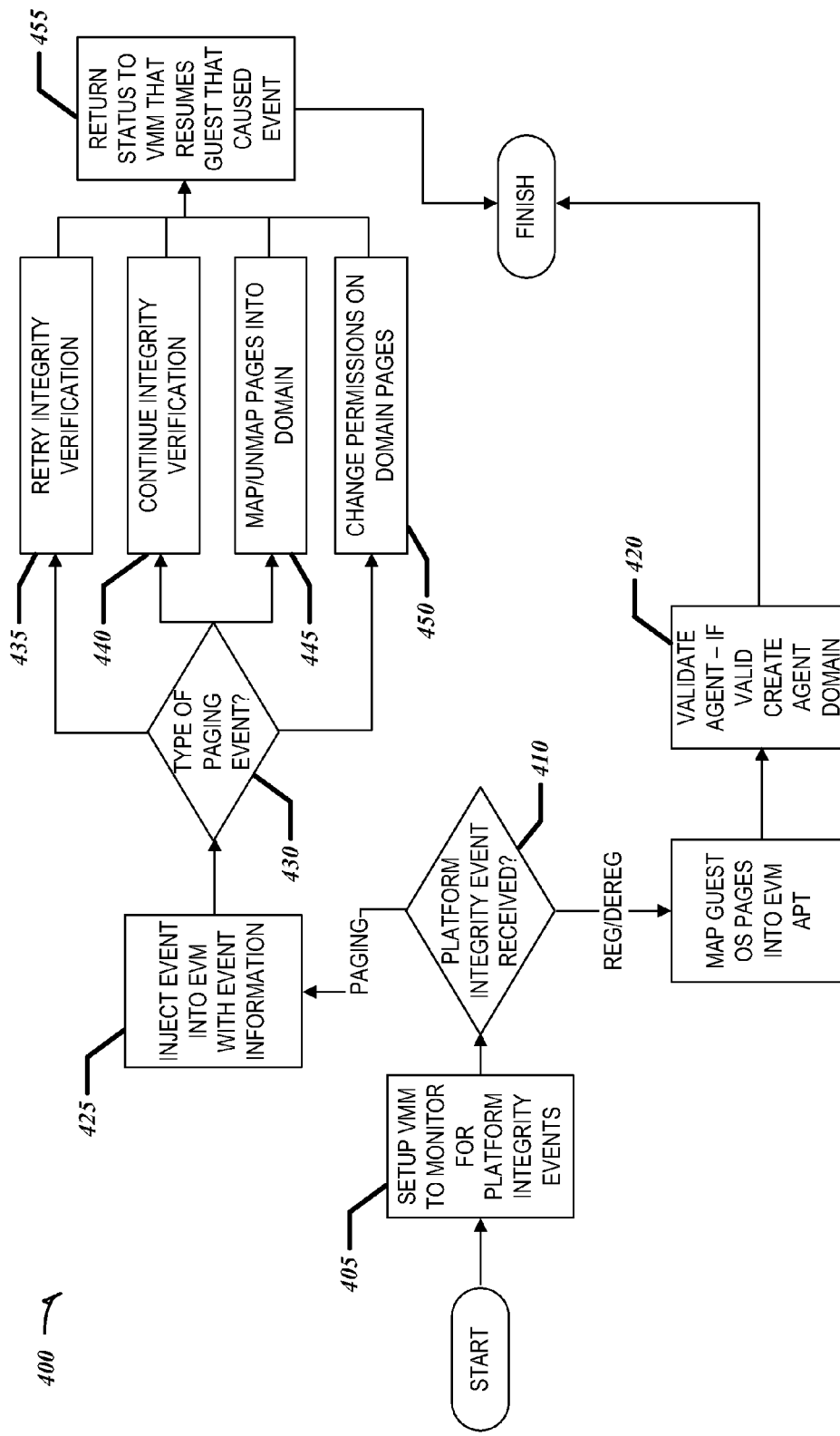
FIG. 4 is a flow diagram illustrating several runtime methods according to various embodiments of the invention.

In this section, particular methods of example embodiments are described by reference to flow charts. The methods to be performed constitute computer programs made up of computer-executable instructions. FIGS. 3 and 4 are flow diagrams illustrating several methods according to various embodiments of the invention.

FIG. 3 is a flow diagram illustrating several setup methods according to various embodiments of the invention. The VMM may be written as a static code block (with no dynamic page table management). The EVM software module is stored in a well known location, ideally in system ROM. The ROM (or disk image) of the EVM (and its manifest) is first measured by the active VMM on the platform. The same storage also contains a signed runtime Integrity Manifest for the EVM. After the disk measurement succeeds, the EVM is loaded into a guest virtual machine (in ring 0/3D) by the VMM. Before it is assigned any privileges the EVM code and static data is measured by the VMM when loaded in memory to ensure the runtime integrity of the EVM. This runtime integrity of the EVM is checked on an opportunistic basis by the VMM. In a separate embodiment, the runtime integrity of the EVM can also be checked by a firmware agent on a micro-controller—for example on an Intel AMT enabled platform. This avoids the VMM from having to perform any runtime verification of the EVM. After the runtime integrity of the EVM is checked, the Active Page Table structure the EVM operates on is updated to map the physical regions where the Active and Protected Page Table structures for the other active guest operating systems is stored.

As shown in FIG. 3, a VMM 106 may offload the physical memory management function into a EVM 104 by first measuring the EVM. The method 300 shown in FIG. 3 begins by measuring the stored EVM image 302. Once the EVM is measured, the EVM manages the page tables for the entire platform unless the image is not valid 304. If the image is valid 306 the EVM is loaded into a guest virtual machine 310. The EVM code and static date is measured in memory 312. Optionally, the EVM information is provided to a manageability engine 314. The EVM active page table is modified to map physical memory that holds guest Active and Protected Page Tables for guest operating systems 316. The EVM uses a static API as an interface to interact with the VMM.

FIG. 4 is a flow diagram illustrating several runtime methods 400 according to various embodiments of the invention.

All paging events received by the VMM due to guest OS activity, such as page faults, moves into control registers, and page invalidate are redirected (injected) into the EVM 425. The VMM may use additional hardware setup 405 to ensure that the EVM activity itself does not cause VM-exits (traps into the VMM).

The EVM maintains state for each guest OS and registered OS agent protection, and returns the information to the VMM, which resumes the guest OS appropriately 455.

In a separate embodiment, the EVM may also pass page table information to the VMM which will store it in processor specific data structures such as the CR3-target list to speed up transfers of control for the guest OS.

On a registration event 410 from an OS agent, the VMM sends an event to the Event Manager which responds with a trigger to the Memory Protection Manager to map the requisite guest OS pages into the EVM 415 for RO purposes. After this setup, the Event manager interacts with the Integrity Measurement module to validate the manifest and then the code and data for the agent 420. On successful measurement, the Memory Manager puts the OS guest agent under protection.

On an access attempt, if a page fault is generated in the guest OS 410, the event information is sent to the Event Manager 425 that validates it with the Memory Manager 430 and then either:

a. Initiates remediation on the platform (e.g., 445).
b. Initiates further integrity checks (e.g., 435, 440)
c. Initiates change of protection on the area accessed (e.g., 450).

The deregistration event is handled similarly as the registration event.

In alternate embodiments, the EVM sends set up code to the VMM.

It may be possible to execute the activities described herein in an order other than the order described. And, various activities described with respect to the methods identified herein can be executed in repetitive, serial, or parallel fashion.

A software program may be launched from a computer-readable medium in a computer-based system to execute functions defined in the software program. Various programming languages may be employed to create software programs designed to implement and perform the methods disclosed herein. The programs may be structured in an object-orientated format using an object-oriented language such as Java or C++. Alternatively, the programs may be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment.

The methods described above provide improved platform security by verifying integrity of software agents at runtime, protecting agents from modification, eavesdropping, and control-flow attacks without requiring modification of the virtual machine monitor. This method allows updates to the Event Manager, Integrity Measurement module and Memory Protection Module for new types of policies and access control semantics without requiring the VMM to increase in complexity.

This has been a detailed description of some exemplary embodiments of the invention(s) contained within the disclosed subject matter. Such invention(s) may be referred to, individually and/or collectively, herein by the term "invention" merely for convenience and without intending to limit the scope of this application to any single invention or inventive concept if more than one is in fact disclosed. The detailed description refers to the accompanying drawings that form a part hereof and which show by way of illustration, but not of limitation, some specific embodiments of the invention, including a preferred embodiment. These embodiments are described in sufficient detail to enable those of ordinary skill in the art to understand and implement the inventive subject matter. Other embodiments may be utilized and changes may be made without departing from the scope of the inventive subject matter.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing Detailed Description, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

It will be readily understood to those skilled in the art that various other changes in the details, material, and arrangements of the parts and method stages which have been described and illustrated in order to explain the nature of this invention may be made without departing from the principles and scope of the invention as expressed in the subjoined claims.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

What is claimed is:

1. A method comprising:
    verifying, by a virtual machine monitor (VMM) executing on a platform, the integrity of an executive virtual machine (EVM), wherein the operation of verifying comprises:
        measuring an image of the EVM stored in a non-volatile storage medium;
        determining whether the image of the EVM in the non-volatile storage medium is valid, based on results of the measuring;
        in response to a determination that the image of the EVM in the non-volatile storage medium is valid, loading the EVM into a guest virtual machine to run in de-privileged mode; and
        before the EVM is assigned any privileges, measuring code and static data for the EVM loaded in memory to ensure runtime integrity of the EVM;
    receiving, at the VMM, a paging event for a second VM;
    redirecting the paging event for the second VM from the VMM to the EVM running in de-privileged mode; and
    in response to receiving the paging event at the EVM, updating, by the EVM, a page table for the second VM.

2. A non-transitory machine-accessible medium having associated instructions, wherein the instructions, when accessed, result in a machine performing the method of claim 1.

3. A method comprising:
    receiving, by a first virtual machine (VM) running in de-privileged mode from a virtual machine monitor (VMM), a paging event for a second VM;
    in response to receiving the paging event for the second VM at the first VM, updating, by the first VM, a page table for the second VM; and
    managing, by the first VM, access to the page tables, including, based on paging events, passing information to an integrity measurement module to initiate integrity measurements for code/data belonging to a registered agent, or a new agent.

4. The method of claim 3 further comprising verifying the integrity of a software component by the first VM.

5. The method of claim 4 further comprising, after verifying the integrity of the software component, setting up memory protections for the software component.

6. The method of claim 5, further comprising preventing code belonging to the software component from being modified by other software components.

7. The method of claim 5, further comprising preventing other software components from reading code and data that the software component intends to keep private.

8. The method of claim 5, further comprising preventing other software components from invoking the software component outside of intended entry points.

9. A non-transitory machine-accessible medium having associated instructions, wherein the instructions, when accessed, result in a machine performing the method of claim 3.

10. A system comprising:
a processor; and
a non-transitory machine-accessible medium responsive to the processor, the machine-accessible medium containing instructions which, when executed by the processor, implement components comprising:
a virtual machine monitor (VMM); and
an executive virtual machine (EVM) to run in de-privileged mode to while managing page tables in place of the VMM;
wherein the VMM is configured to verify integrity of the EVM using operations comprising:
measuring an image of the EVM stored in a non-volatile storage medium;
determining whether the image of the EVM in the non-volatile storage medium is valid, based on results of the measuring;
in response to a determination that the image of the EVM in the non-volatile storage medium is valid, loading the EVM into a guest virtual machine to run in de-privileged mode; and
before the EVM is assigned any privileges, measuring code and static data for the EVM loaded in memory to ensure runtime integrity of the EVM;
wherein the VMM is further configured to perform operations comprising:
receiving a paging event for a second VM; and
redirecting the paging event for the second VM to the EVM running in de-privileged mode; and
wherein the EVM is configured to update a page table for the second VM in response to receiving the paging event for the second VM from the VMM.

11. The system of claim 10 wherein the executive virtual machine comprises an integrity measurement module to measure the integrity of a software component at runtime.

12. The system of claim 10 wherein the EVM further comprises a memory protection module to setup memory protection for the software component.

13. The system of claim 12 wherein the memory protection module is configured to protect the software component from modification.

14. The system of claim 12 wherein the memory protection module is configured to protect the software component from eavesdropping.

15. The system of claim 12 wherein the memory protection module is configured to protect the software component from control-flow attacks.

16. The system of claim 12 wherein the executive virtual machine comprises an event manager to receive paging events from the virtual machine monitor for integrity services.

* * * * *

UNITED STATES PATENT AND TRADEMARK OFFICE
CERTIFICATE OF CORRECTION

PATENT NO. : 8,464,251 B2
APPLICATION NO. : 11/695021
DATED : June 11, 2013
INVENTOR(S) : Ravi Sahita et al.

Page 1 of 1

It is certified that error appears in the above-identified patent and that said Letters Patent is hereby corrected as shown below:

In the Claims:

In claim 10, in column 7, line 13, "mode to" is corrected to state "mode".

Signed and Sealed this
Tenth Day of September, 2013

Teresa Stanek Rea
*Acting Director of the United States Patent and Trademark Office*